United States Patent [19]
Myers et al.

[11] Patent Number: 6,058,341
[45] Date of Patent: May 2, 2000

[54] VEHICLE OCCUPANT WEIGHT ESTIMATION APPARATUS HAVING CONTROLLED VOLUME SEAT BLADDER

[75] Inventors: Robert Joseph Myers, Russiaville; Morgan Daniel Murphy, Kokomo; Robert Allan Perisho, Jr., Russiaville; Pamela Ann Roe, Kokomo; Duane Donald Fortune, Lebanon; Stuart Stites Sullivan, Peru; William Lloyd Piper; Robert Keith Constable, both of Kokomo, all of Ind.

[73] Assignee: Delco Electronics Corp., Kokomo, Ind.

[21] Appl. No.: 09/039,238

[22] Filed: Mar. 16, 1998

Related U.S. Application Data

[63] Continuation-in-part of application No. 08/923,020, Sep. 3, 1997, Pat. No. 5,987,370.

[51] Int. Cl.[7] .............................. G06F 17/00; G05D 3/00
[52] U.S. Cl. .............................. 701/45; 701/49; 280/735; 297/284.6; 180/273
[58] Field of Search ................................ 701/45, 46, 49, 701/36; 280/735, 730.1, 734; 180/273, 271, 282; 297/DIG. 3, DIG. 8, 488, 216.13, 452.41, 192.12, 284.6, 284.9, 253; 177/209; 73/768, 862.331; 340/667, 666, 665; 5/655.3, 654, 710, 713, 706

[56] References Cited

U.S. PATENT DOCUMENTS

| | | | |
|---|---|---|---|
| 4,707,027 | 11/1987 | Horvath et al. | 297/284.6 |
| 4,938,528 | 7/1990 | Scott | 297/284.6 |
| 5,474,327 | 12/1995 | Schousek | 280/735 |
| 5,658,050 | 8/1997 | Lorbiecki | 297/452.41 |
| 5,739,757 | 4/1998 | Gioutsos | 340/667 |
| 5,904,219 | 5/1999 | Anahid et al. | 180/273 |
| 5,905,210 | 5/1999 | O'Boyle et al. | 73/862.331 |
| 5,918,696 | 7/1999 | Van Voorhies | 180/273 |
| 5,957,491 | 9/1999 | Cech et al. | 280/735 |
| 5,975,629 | 11/1999 | Lorbiecki | 297/200 |
| 5,987,370 | 11/1999 | Murphy et al. | 701/45 |

*Primary Examiner*—Jacques H. Louis-Jacques
*Attorney, Agent, or Firm*—Jimmy L. Funke

[57] ABSTRACT

A weight estimation apparatus for the passenger seat of a motor vehicle, in which a single bladder substantially encompassing the seat bottom is evacuated and then inflated with a known volume of air. The average pressure in the bladder is determined to estimate the passenger weight. According to a first embodiment, the apparatus continues to monitor the average pressure, and the process is re-initiated if the average pressure changes by at least a predetermined percentage. According to a second embodiment, a bleed valve allows the pressure in the bladder to slowly escape, and the apparatus monitors the rate of change in pressure as a corresponding indication of passenger weight; in this embodiment, the process of evacuating and inflating is re-initiated if the monitored change in pressure does not correspond with the estimated weight. The sides of the bladder may be pleated to permit the bladder to expand under the weight of an occupant without stretching the bladder, and thereby affecting the average pressure. A temperature sensor may be disposed in proximity to the bladder provides a temperature signal for compensating the weight estimation for temperature variations. Also, the pressure sensor may be configured to sense the gage pressure—that is, the differential pressure between the bladder pressure and atmospheric pressure; alternatively, the pressure sensor may be configured to detect absolute pressure, and a second absolute pressure sensor responsive to atmospheric pressure may be used to compensate for changes in atmospheric pressure.

10 Claims, 5 Drawing Sheets

VEHICLE OCCUPANT WEIGHT ESTIMATION APPARATUS HAVING CONTROLLED VOLUME SEAT BLADDER

This application is a continuation-in-part of U.S. Ser. No. 08/923,020, entitled Vehicle Occupant Weight Estimation Apparatus Having Fluid-Filled Seat Bladder, filed Sep. 3, 1997, now U.S. Pat. No. 5,987,370, and assigned to the assignee of the present invention.

BACKGROUND OF THE INVENTION

Vehicle occupant detection systems are useful in connection with air bags and other pyrotechnically deployed restraints as a means of judging whether, and how forcefully, to deploy the restraint. One fundamental parameter in this regard is the weight of the occupant, as weight may be used as a criteria to distinguish between an adult and an infant or small child.

One prior weight estimation technique is to install an array of variable resistance pressure sensitive elements in the seat, and to sum the individual pressures to determine occupant weight. A restraint system based on this technique is shown and described in the U.S. Pat. No. 5,474,327, issued on Dec. 12, 1995, and assigned to the assignee of the present invention. In practice, however, such systems tend to be relatively costly to implement, and require a significant amount of signal processing for proper calibration and weight estimation.

Another technique, described in U.S. Ser. No. 08/801,218, entitled Adaptive Seating System, filed on Feb. 19, 1997, pending, and assigned to General Motors Corporation, involves measuring and adjusting the pressure in several inflated bladders variously located in a given passenger seat. When a sharp increase in the measured pressures is detected, the passenger weight is estimated based on a comparison of current pressures with previously measured "vacant seat" pressures.

Also, designers of seating, athletic shoes and the like have utilized a technique in which a large number of small bladders distributed throughout the area of interest are individually and sequentially evacuated and then filled with a known volume of air. Pressure readings from each bladder are stored and used to create a pressure distribution map.

SUMMARY OF THE PRESENT INVENTION

The present invention is directed to an improved weight estimation apparatus for the passenger seat of a motor vehicle, in which a single bladder substantially encompassing the seat bottom is evacuated and then inflated with a known volume of air. The average pressure in the bladder is determined to estimate the passenger weight. According to a first embodiment, the apparatus continues to monitor the average pressure, and the weight estimation sequence is re-initiated if the average pressure changes by at least a predetermined percentage. According to a second embodiment, a bleed valve allows the pressure in the bladder to slowly escape, and the apparatus monitors the rate of change in pressure as a corresponding indication of passenger weight; in this embodiment, the weight estimation sequence is re-initiated if the monitored change in pressure does not correspond with the estimated weight.

Fundamentally, the apparatus comprises an elastomeric bladder installed in the foam cushion of a vehicle seat bottom, a controller, and a pressure sensor, a pump and one or more electrically activated valves coupled to a port of the bladder. The sides of the bladder may be pleated to permit the bladder to expand under the weight of an occupant without stretching the bladder, and thereby affecting the average pressure. A temperature sensor disposed in proximity to the bladder provides a temperature signal for compensating the weight estimation for temperature variations. Also, the pressure sensor may be configured to sense the gage pressure—that is, the differential pressure between the bladder pressure and atmospheric pressure.

DETAILED DESCRIPTION OF THE DRAWINGS

Figure 1:
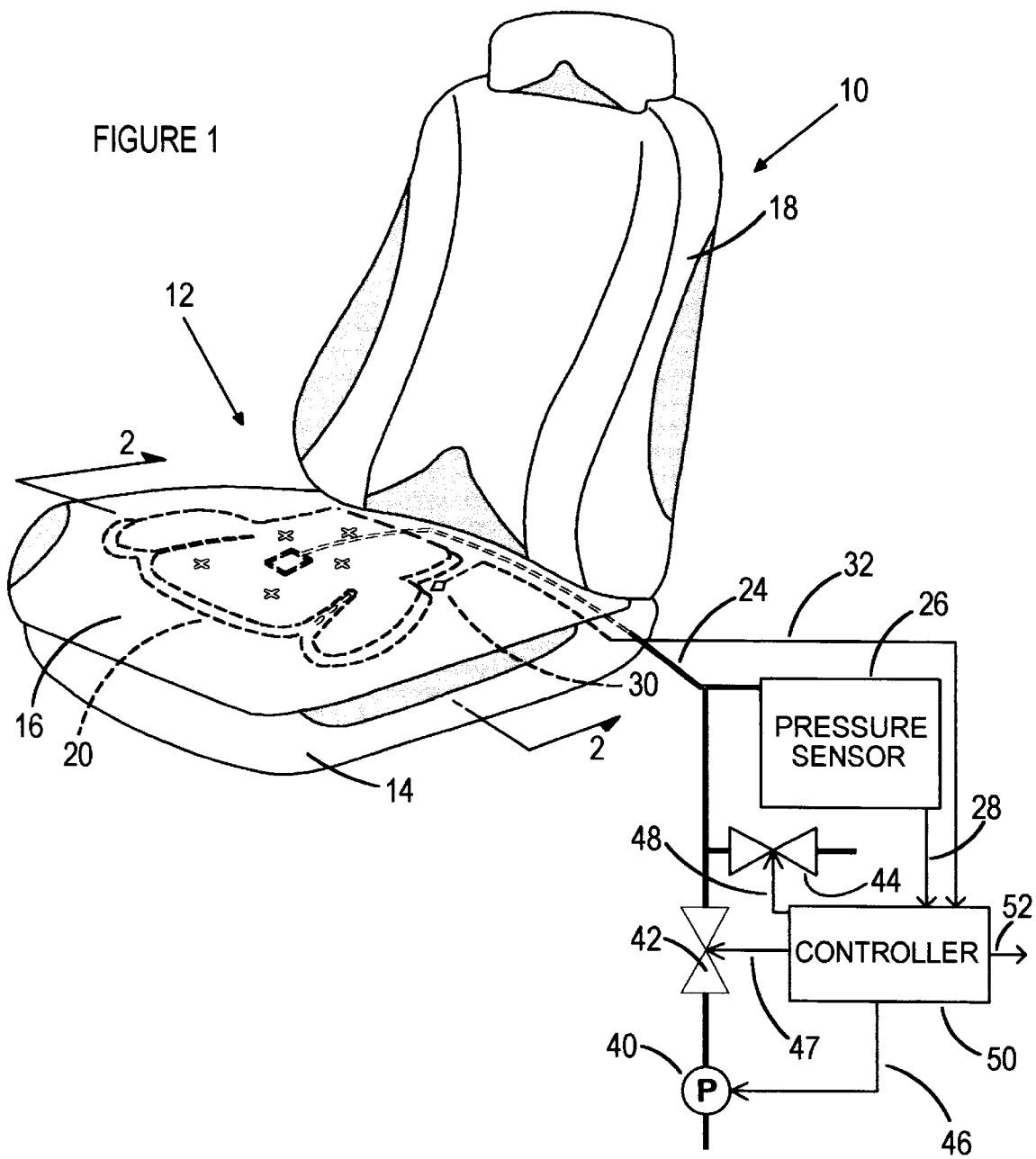
FIG. 1 is a system diagram illustrating a motor vehicle passenger seat equipped with a seat bottom bladder and a controller for estimating the weight of a seat occupant in accordance with this invention.

Referring to the drawings, and particularly to FIG. 1, the reference numeral 10 generally designates a vehicle occupant weight estimation apparatus according to this invention. The vehicle seat 12 is supported on a frame 14, and includes foam cushions 16 and 18 on the seat bottom and back. A vacuum formed polymeric bladder 20 is disposed in the seat bottom foam cushion 16 and substantially encompasses the seating area of cushion.

Figure 2:
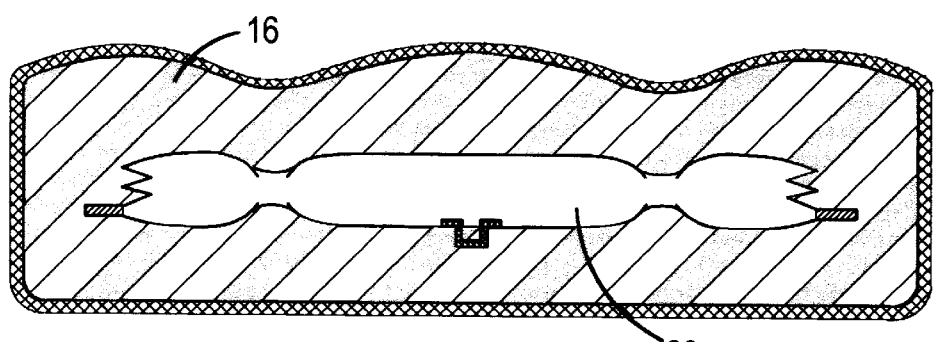
FIG. 2 is a cross-section view of a foam seat cushion and pleated bladder according to this invention.

Referring to FIGS. 1 and 2, the bladder 20 includes a port coupled by pneumatic tube 24 to a pressure sensor 26, which provides an electrical output signal on line 28 indicative of the fluid pressure in the bladder 20. A temperature sensor 30 located in proximity to the bladder 20 provides an electrical output signal on line 32 indicative of the bladder and foam temperature. The sensor 30 can be provided as a separate sensor as indicated in FIG. 1, or may be integrated with the pressure sensor 26. The tube 24 is also coupled to a pneumatic pump 40 through an electrically operated inflation valve 42, and to atmospheric pressure through an electrically operated exhaust valve 44. Although depicted remote from seat 12, the pump 40, sensor 26 and valves 42, 44 may be packaged integral with seat 12, if desired.

The electrical pressure and temperature signals on lines 28 and 32 are provided as inputs to a controller 50, which controls the pump 40, the inflation valve 42 and the exhaust valve 44 via lines 46, 47 and 48, respectively. Controller 50 periodically carries out a weight estimation sequence in which the bladder 20 is evacuated and then inflated with a known volume of air, whereafter the weight of an occupant is estimated based on the average pressure sensed by sensor 26, in combination with the temperature signal on line 32. An electrical output signal indicative of the weight estimation is provided on line 52, and may be used, for example, as a factor in determining whether and how forcefully to deploy air bags or other pyrotechnically deployed restraints in a crash event. The controller 50 may be mechanized with a suitably programmed microprocessor, as described below in reference to FIGS. 6–8.

Figure 3:
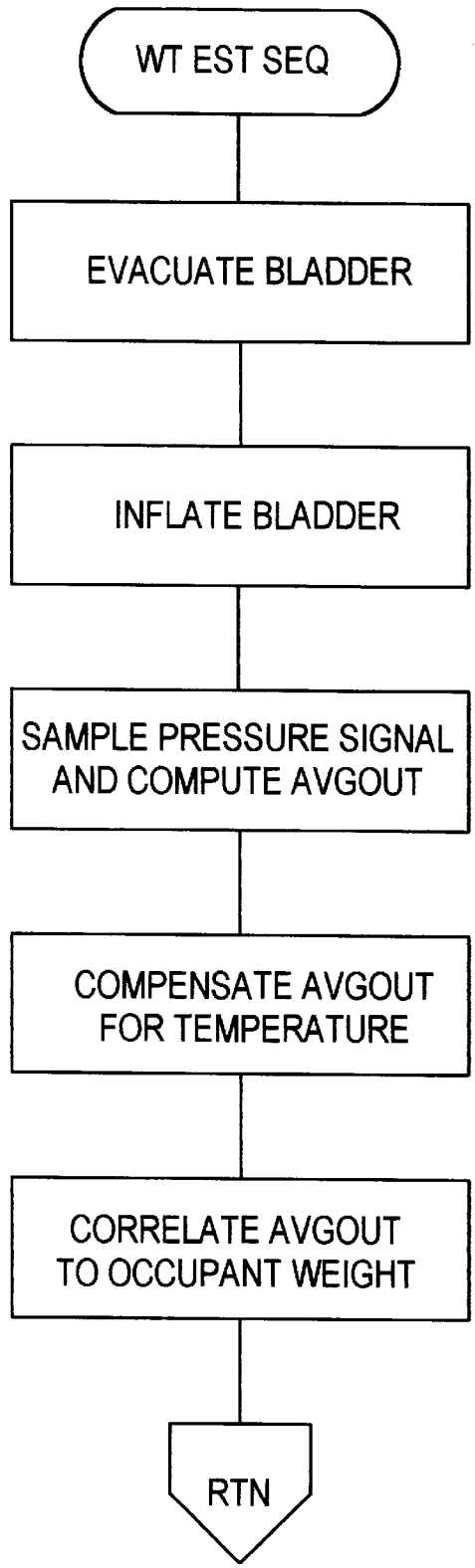
FIG. 3 is a flow diagram of a weight estimation sequence according to this invention.

As seen in the flow diagram of FIG. 3, the weight estimation sequence carried out by controller 50 is initiated by opening inflation valve 42 and driving pump 40 in reverse to evacuate bladder 20. Initially, this step is carried out at closure of the vehicle's ignition switch, and repeated at various times during the ensuing operation of the vehicle, as explained below. After the bladder 20 has been evacuated, which may be ensured by operating the pump 40 for a prescribed period of time, for example, the pump 40 is operated in the forward direction for a predetermined interval to order to inflate bladder 20 with a known volume of air. Thereafter, the inflation valve 42 is closed, and the controller 50 monitors the pressure sensor output signal on line 32 to determine the average signal voltage AVGOUT (or pressure) observed over a prescribed interval, such as 5 seconds; this pressure is referred to herein as the primary average pressure value. Preferably, the pressure sensor 26 is configured to sense the differential or gage pressure of the fluid—that is, the pressure difference between atmospheric pressure and bladder fluid pressure—in order to provide a pressure measurement that is insensitive to atmospheric pressure variations due to changing weather patterns or altitude. In this case, the sensor 26 includes a second inlet (not shown) open to atmospheric pressure. Alternately, the sensor 26 may provide an absolute pressure measurement, and the controller 50 may compensate the measurement for atmospheric pressure variations by reducing the fluid pressure measurement by an atmospheric pressure measurement provided by an auxiliary pressure sensor (not shown). The primary average pressure is then compensated for the detected temperature of the seat foam to provide a measurement that is insensitive to temperature dependent variations in foam and bladder stiffness. Finally, the compensated average value (AVGOUT') is correlated to occupant weight. An estimated weight below a calibrated threshold indicates that the seat is vacant, and an estimated weight below a very low threshold indicates that the bladder 20 has not been properly inflated due to a failure or breach.

According to a first embodiment of this invention, the controller 50 continues to monitor the average pressure after the weight estimation sequence has been carried out, and re-initiates the sequence if the average pressure deviates from the primary average pressure value by more than a threshold amount. In the illustrated embodiment, the controller 50 forms a pressure window bounded by the primary average pressure ±5%. When the average pressure falls outside the pressure window, which may occur due to re-positioning or exiting of the occupant, the weight estimation sequence is re-initiated to update the weight estimate signal on line 52.

According to a second embodiment of this invention, the air in bladder 20 is slowly released after the weight estimation sequence has been carried out, and controller 50 monitors the rate of change in pressure as a secondary indication of average pressure or passenger weight. The release of the bladder air may be accomplished affirmatively through the control of an electrically operated bleed valve, such as the exhaust valve 44, or passively through the use of a suitable orifice or molecular sieve (not shown). If the secondary pressure or weight estimation deviates from the primary pressure or weight estimation by more than a predetermined amount analogous to the ±5% pressure window described above, or if the pressure reaches a near-zero threshold, the weight estimation sequence is re-initiated to update the weight estimate signal on line 52.

Figure 4:
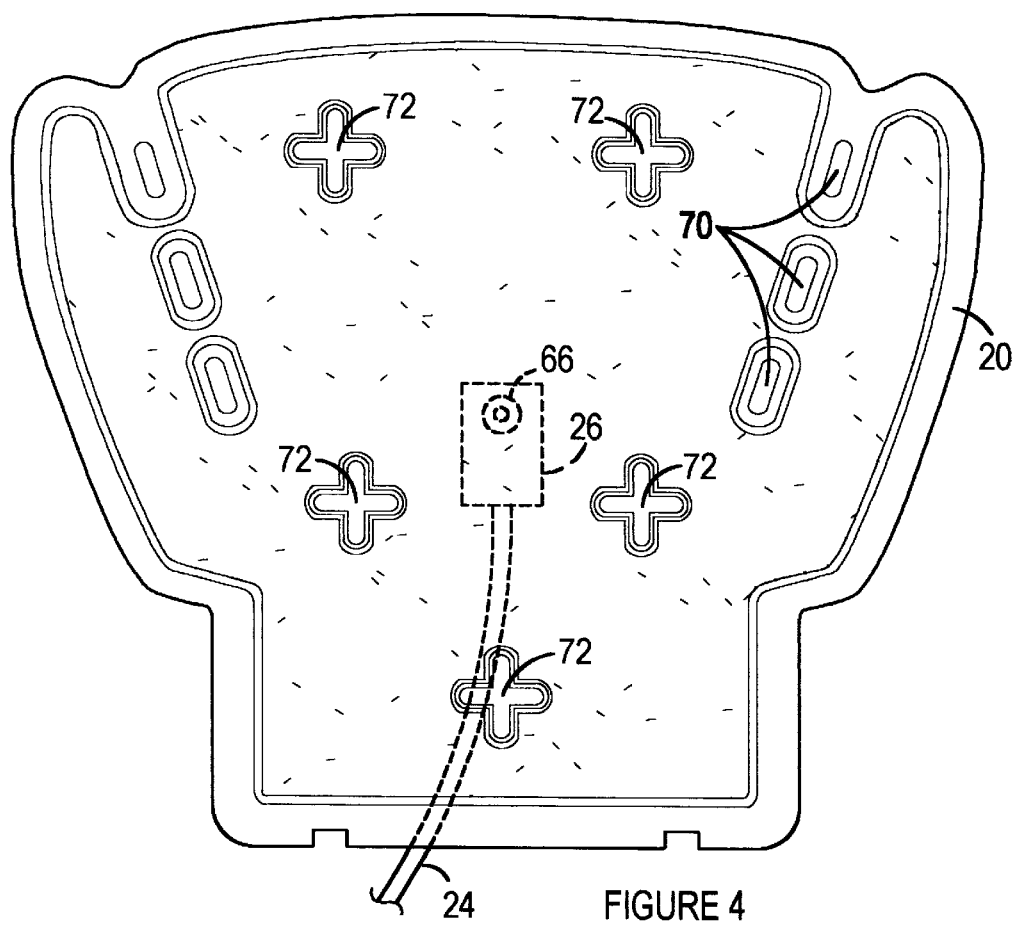
FIG. 4 depicts a top view of the bladder of FIG. 1.

As best seen in FIG. 4, the bladder 20 generally conforms to the shape of the seat bottom 16. Various openings and crimp areas 70 allow the bladder 20 to conform to the shape of the seat cushion, while other crimp areas 72 are required to properly position the bladder in the vacuum form equipment. The crimp areas 70, 72 do not degrade the pressure measurement since the air can freely flow in and out of the various areas or cells of the bladder 20. In fact, the crimp areas can be advantageously used to reduce the overall volume of the bladder 20, provided that friction losses from air flow within the bladder 20 are minimized.

Also, the peripheral edges of bladder 20 are preferably pleated as shown in the cross-section FIG. 2. This permits the volume of bladder 20 to expand under the weight of an occupant without stretching the bladder, and thereby affecting the average pressure. This feature is especially important if the altitude of the vehicle changes significantly, as the pleating allows the bladder volume to increase as required without stretching the bladder material.

Figure 5A:
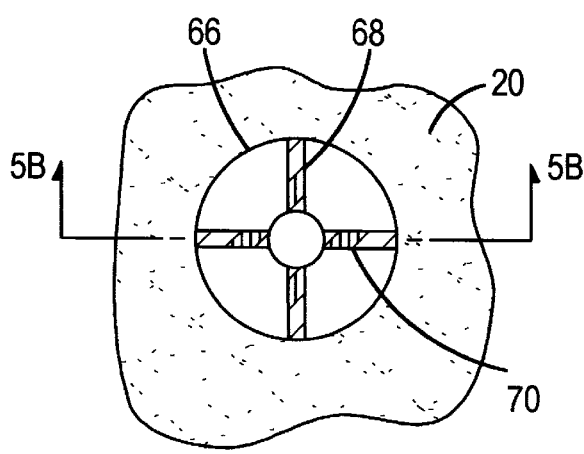
FIGS. 5A–5B depict a bladder and pressure sensor configuration according to a preferred embodiment of this invention.
Figure 5B:
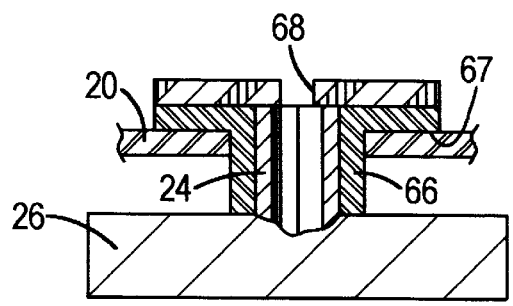

A preferred implementation of the bladder port is depicted in FIGS. 5A–5B. As best seen in FIG. 5B, the bladder 20 is sealed around a tube 66 at a shoulder 67 thereof, and tube 24 is sealed within tube 66. As best seen in FIG. 5A, the tube 66 is configured with side ports 68, 70 to ensure open fluid communication between the bladder fluid and pneumatic tube 24 at all times. The length of tube 66 may be minimized by placing the pressure sensor 26 in close proximity to bladder 20, as shown in FIG. 5B. However, the sensor 26 may be located remote from the bladder if required by simply extending the tubes 66 and/or 24, as depicted in FIG. 1; in such case, the tubes 66 and/or 24 should have a relatively large diameter to minimize the resulting pressure drop.

Figure 6:
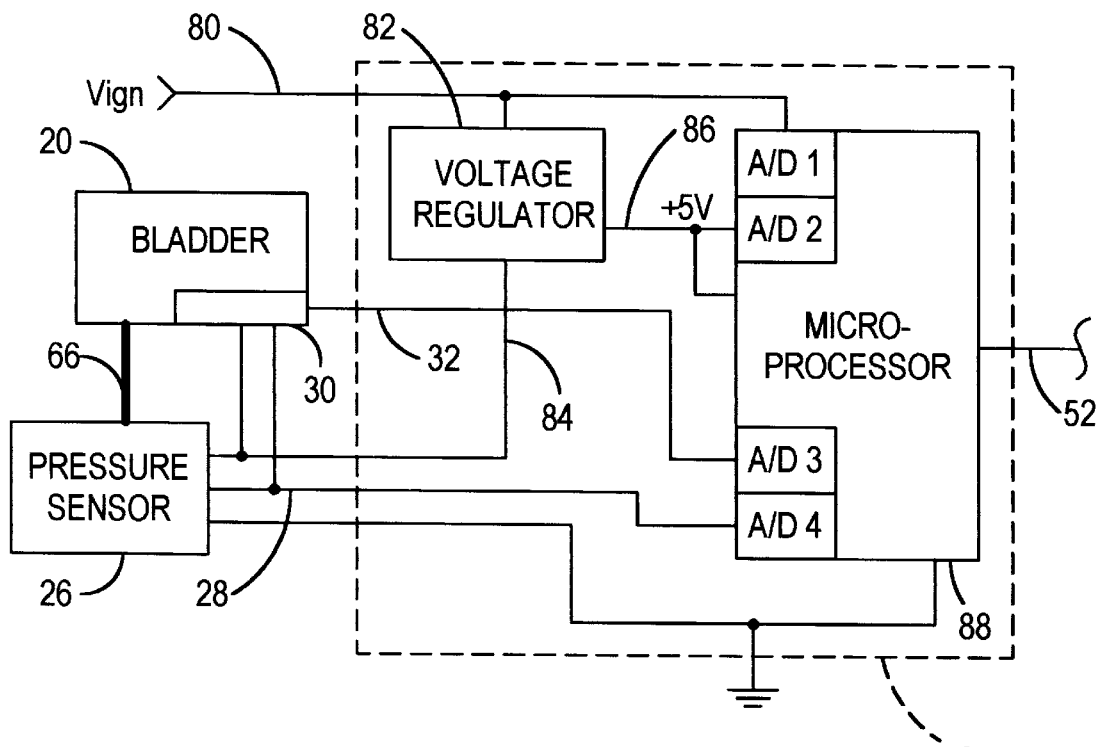
FIG. 6 is a block diagram of the controller of FIG. 1, in the context of an air bag deployment system.

FIG. 6 depicts the occupant weight estimation apparatus of the present invention in the context of an air bag deployment system in which the controller 50 provides an output signal on line 52 indicating whether deployment should be inhibited or allowed based on sensed occupant weight. Vehicle ignition voltage Vign, which may be +12 VDC, is supplied to controller 50 via line 80, and an internal voltage regulator 82 provides a regulated system voltage of +5 VDC on lines 84 and 86. The system and ground voltages are supplied to source voltage terminals of the pressure sensor 26, the temperature sensor 30 (which may be a thermistor), and a microprocessor 88. The microprocessor 88 has four analog-to-digital input channels A/D 1-A/D 4 which receive the ignition voltage vign, the system voltage of voltage regulator 82, the temperature sensor output voltage on line 32, and the pressure sensor output voltage on line 28.

Based on the above-described inputs, the microprocessor determines the occupant weight, and based on predetermined criterion, whether air bag deployment should be inhibited or allowed. In the illustrated control strategy, air bag deployment is to be inhibited for occupants below a predetermined weight, referred to herein as the threshold weight.

Figure 7:
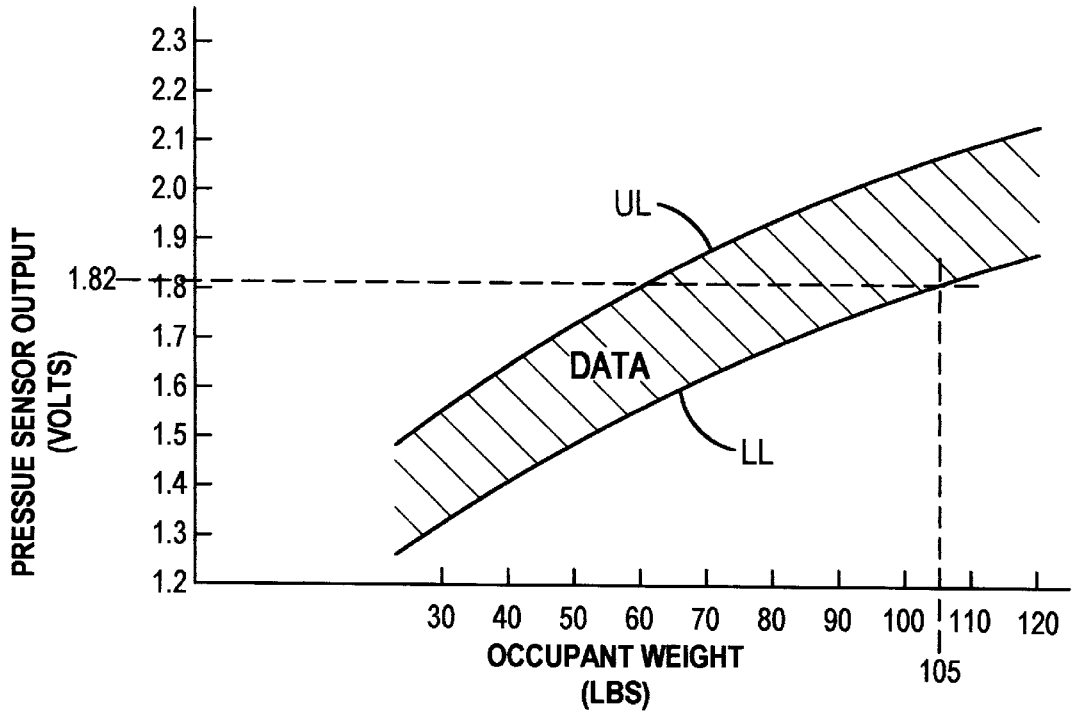
FIG. 7 is a graph depicting pressure sensor output voltage as a function of occupant weight, as used in the system of FIG. 6.

In general, once the occupant weight estimation system is installed in a vehicle, the relationship between occupant weight and the determined average pressure (compensated for system voltage variations) is empirically determined at a variety of temperatures. In a system as suggested in FIG. 1, the data can be used to construct either a mathematical model or a multi-dimensional look-up table of occupant weight as a function of temperature and average pressure sensor output voltage, with the model or table programmed into the microprocessor and used to determine and output the occupant weight on line 52. In the system of FIG. 6, however, the output merely indicates whether the occupant is above or below the threshold weight, within the system tolerance constraints. In this case, the empirically determined data may be plotted as shown in FIG. 7, and used to develop a pressure sensor threshold voltage for determining whether deployment should be inhibited or allowed. For the data represented in FIG. 7, for example, the lines designated as upper limit UL and lower limit LL bound the pressure sensor output voltage variability for any given occupant weight. Given a threshold weight, such as 105 lbs for example, the lower limit LL defines a threshold voltage which is the minimum voltage, approximately 1.82 volts, one would expect to see for an occupant weighing 105 lbs.

Figure 8:
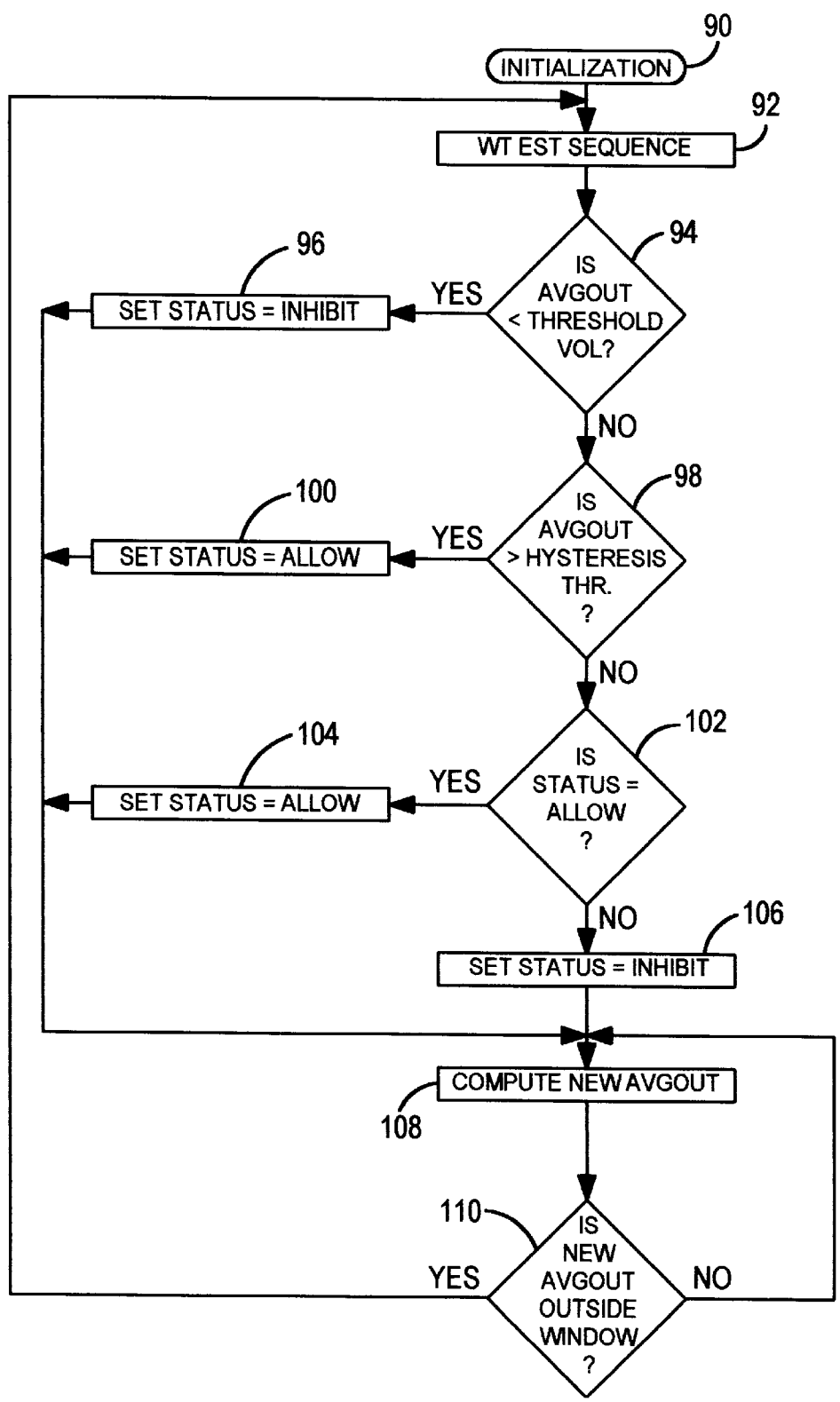
FIG. 8 is a flow chart representative of computer program instructions executed by the controller of FIG. 6.

A simple control algorithm based on the above described threshold voltage is depicted in the flow diagram of FIG. 8, where the block 90 designates a series of program instructions executed at the initiation of vehicle operation for initializing the various registers and variable values. In this case, the system output variable, STATUS, is initially set to a state which inhibits deployment. Thereafter, the block 92 is executed to carry out the weight estimation sequence described above in reference to FIG. 3 to obtain a temperature compensated average output voltage AVGOUT'. If AVGOUT' is less than the threshold voltage of 1.82 volts, as determined at block 94, the block 96 is executed to set STATUS to a state which inhibits deployment. If AVGOUT' is greater than a hysteresis threshold voltage corresponding to, say 107 lbs, as determined at block 98, the block 100 is executed to set STATUS to a state which allows deployment. If AVGOUT' is between the two threshold voltages, the state of STATUS is maintained unchanged, as indicated by the blocks 102–106. Thereafter, according to the first embodiment of this invention, the blocks 108 and 110 are executed to determine a new value of AVGOUT and to compare it to an average voltage window having upper and lower bounds based on the value of AVGOUT determined at block 92, ±5%. When the new value of AVGOUT falls outside of the window, block 110 is answered in the affirmative, and the weight estimation sequence of block 92 is repeated, as indicated. In an alternative control according to the second embodiment of this invention, the controller 50 activates bleed valve 44, monitors the rate of change of the pressure sensor voltage, correlates it to an average sensor voltage, and compares it with the value of AVGOUT determined at block 92.

It should be understood that the simple control described above is exemplary in nature, and could be modified to include adaptive updating of the thresholds, or to provide a more precise output as described above in reference to FIG. 1, for example. Likewise, it should be understood in general that while the occupant weight estimation apparatus of this invention has been described in reference to the illustrated embodiments, various modifications will occur to persons skilled in the art and that systems incorporating such modifications may fall within the scope of this invention, which is defined by the appended claims.

The embodiments of the invention in which an exclusive property or privilege is claimed are defined as follows:

1. Apparatus for estimating the weight of an occupant of a seat in a motor vehicle, the seat having a foam cushion bottom, the apparatus comprising:

an elastomeric bladder substantially encompassing a seating area of the foam cushion bottom;

a pump coupled to the bladder;

a pressure sensor for developing a pressure signal corresponding to the pressure in the bladder; and a controller for initiating a weight estimation sequence of operations, including (1) operating the pump to substantially evacuate the bladder, (2) operating the pump to inflate the bladder with a predetermined volume of fluid, (3) monitoring the pressure signal, (4) determining an average value of the pressure signal after the bladder has been inflated, and (5) estimating the weight of the occupant based on the determined average pressure value, wherein subsequent to the weight estimation sequence of operations, the controller periodically determines average values of the pressure signal after the bladder has been inflated, and re-initiates the weight estimation sequence of operations when a periodically determined average pressure value deviates from the average pressure value on which the estimated weight was based by at least a predetermined amount.

2. The apparatus of claim 1, wherein the bladder has a periphery that is pleated to allow the bladder volume to expand under the weight of an occupant without stretching the bladder, thereby minimizing variation in the determined average pressure value.

3. The apparatus of claim 1, including a temperature sensor disposed in proximity to the bladder for providing a temperature signal, wherein the controller compensates the determined average pressure value for temperature variations.

4. The apparatus of claim 1, where the pressure sensor is configured to sense a differential pressure between the bladder pressure and atmospheric pressure.

5. The apparatus of claim 1, wherein said controller provides an input to an air bag deployment system, said input indicating whether deployment should be inhibited or allowed based on the estimated weight of the occupant.

6. The apparatus of claim 1, wherein the predetermined amount is a predetermined percentage of the average pressure value on which the estimated weight was based.

7. The apparatus of claim 1, wherein said controller provides a status signal to an air bag deployment system, and includes:

means for sampling an output of said pressure sensor, compensating said sampled output for temperature based on an output of said temperature sensor, and comparing said compensated pressure sensor output to a threshold signal corresponding to a threshold occupant weight; and means for setting said status signal to a value for inhibiting air bag deployment when said comparison indicates that the estimated occupant weight is less than said threshold weight, and for setting said status signal to a value for allowing air bag deployment when said comparison indicates that the estimated occupant weight is greater than said threshold weight.

8. Apparatus for estimating the weight of an occupant of a seat in a motor vehicle, the seat having a foam cushion bottom, the apparatus comprising:

an elastomeric bladder substantially encompassing a seating area of the foam cushion bottom;

a pump coupled to the bladder;

a pressure sensor for developing a pressure signal corresponding to the pressure in the bladder;

a controller for initiating a weight estimation sequence of operations, including (1) operating the pump to substantially evacuate the bladder, (2) operating the pump to inflate the bladder with a predetermined volume of fluid, (3) monitoring the pressure signal, (4) determining an average value of the pressure signal after the bladder has been inflated, and (5) estimating the weight of the occupant based on the determined average pressure value;

a bleed valve for allowing the pressure in the bladder to slowly escape subsequent to the weight estimation sequence of operations; and wherein the controller monitors a rate of change in said pressure signal, determines a secondary estimation of occupant weight based on said monitored rate of change, and re-initiates the weight estimation sequence of operations when the secondary estimation of weight deviates from the estimated weight by at least a predetermined amount.

9. The apparatus of claim 8, wherein the predetermined amount is a predetermined percentage of the average pressure value on which the estimated weight was based.

10. The apparatus of claim 8, where the controller re-initiates the weight estimation sequence of operations when the pressure signal corresponds substantially to zero pressure.

* * * * *